(12) United States Patent
Barton

(10) Patent No.: US 10,512,260 B2
(45) Date of Patent: Dec. 24, 2019

(54) METHOD AND APPARATUS FOR AUTOMATED ANIMAL TRAPPING

(71) Applicant: Patrick Barton, Portland, OR (US)

(72) Inventor: Patrick Barton, Portland, OR (US)

(*) Notice: Subject to any disclaimer, the term of this patent is extended or adjusted under 35 U.S.C. 154(b) by 218 days.

(21) Appl. No.: 15/432,714

(22) Filed: Feb. 14, 2017

(65) Prior Publication Data
US 2017/0231215 A1  Aug. 17, 2017

Related U.S. Application Data

(60) Provisional application No. 62/295,108, filed on Feb. 14, 2016.

(51) Int. Cl.
| | |
|---|---|
| *A01M 31/00* | (2006.01) |
| *A01M 23/02* | (2006.01) |
| *A01M 25/00* | (2006.01) |
| *A01K 11/00* | (2006.01) |
| *A01K 29/00* | (2006.01) |
| *H04N 5/225* | (2006.01) |
| *H04N 7/18* | (2006.01) |
| *G06K 9/00* | (2006.01) |
| *H04N 5/33* | (2006.01) |

(52) U.S. Cl.
CPC ......... *A01M 31/002* (2013.01); *A01K 11/006* (2013.01); *A01K 29/005* (2013.01); *A01M 23/02* (2013.01); *A01M 25/00* (2013.01); *G06K 9/00362* (2013.01); *H04N 5/2256* (2013.01); *H04N 5/332* (2013.01); *H04N 7/188* (2013.01)

(58) Field of Classification Search
CPC .... A01M 31/002; A01M 23/00; A01M 23/02; A01M 23/16; A01M 23/20; A01M 25/00; A01M 25/004; A01K 11/006; A01K 29/005; G06K 9/00362
See application file for complete search history.

(56) References Cited

U.S. PATENT DOCUMENTS 3,225,485 A * 12/1965 Powell ................. A01M 23/00
43/131
2007/0248219 A1 * 10/2007 Foster .................. H04M 11/007
379/102.06

(Continued)

*Primary Examiner* — Christopher R Harmon
(74) *Attorney, Agent, or Firm* — Vernon W. Francissen

(57) ABSTRACT

Methods and apparatuses are shown for selectively capturing a targeted animal that are directed to capturing an animal in a capture module having a one way capture mechanism and, using instructions executing in a controller, sensing the animal in an identification module and, responsive thereto, capturing an image of the animal, analyzing the captured image to identify whether the animal is a targeted animal, if the animal is the targeted animal, processing the animal, and releasing the animal. Additional examples involve performing chromatic or pattern analysis on the captured image, using the chromatic or patent analysis results, searching a database for machine recognized animal colors or patterns, generating a probabilistic assessment based on color or pattern of whether the animal in the identification module is the targeted animal, and generating a target determination indication based on the probabilistic assessment based on color or pattern. Processing the animal may include injecting the animal using a syringe.

19 Claims, 14 Drawing Sheets

(56) References Cited

U.S. PATENT DOCUMENTS

| | | | |
|---|---|---|---|
| 2011/0119987 A1* | 5/2011 | Alter | A01M 23/20 43/61 |
| 2013/0249218 A1* | 9/2013 | Vassilev | A01M 29/16 290/55 |
| 2015/0296766 A1* | 10/2015 | Gaskamp | A01M 23/22 43/61 |

* cited by examiner

METHOD AND APPARATUS FOR AUTOMATED ANIMAL TRAPPING

CROSS REFERENCE TO RELATED APPLICATIONS

This application claims the benefit of U.S. Provisional Patent Appl. No. 62/295,108 for "Method and Apparatus for Automated, Intelligent Snake and Animal Trapping" filed Feb. 14, 2016, herein incorporated by reference in its entirety for all purposes.

BACKGROUND

Man has coexisted with snakes since time immemorial and, at least since Biblical times, has had a variety of issues with them. Present issues include unwanted occupation of homes and gardens and threats to disrupt entire ecosystems such as the Everglades in the role of invasive species.

Many snakes, such as Burmese pythons are notoriously hard to see, even by experienced experts. They are stealthy, sometimes nocturnal, and very athletic. As a result, snakes are very difficult to capture or recapture in real time by humans. This makes an effective means of trapping snakes and important management topic, particularly for invasive species.

Currently existing snake trapping systems are mostly non-discriminate in their nature, though one developed by John Humphrey does discriminate on weight and size. All current art surveyed has the possibility to be lethal if captured animal is not released in a timely fashion, hence requires frequent human attendance to avoid killing non-targeted species Conventional approaches generally cannot make an affirmative identification, electively kill targeted species, or acquire and communicate information about prospective captives.

SUMMARY

According to one aspect of the present invention, an example of an apparatus for selectively capturing a targeted animal includes a capture module having a body with first and second openings formed therein and an entryway positioned in the first opening and having a diameter selected to limit a size of animals that may enter. A flexible capture mechanism is attached to the entryway and has a downstream end positioned adjacent the second opening of the capture module body. The flexible capture mechanism has a perimeter that is resistant to penetration by animals and the flexibility is selected to require a minimum level of strength required to spread the capture mechanism and pass through the downstream end. The downstream end of the capture mechanism is normally biased in a closed position. A capture sensor generates a capture signal responsive to the downstream end of the capture mechanism being forced open.

An identification module has a body with first and second openings, where the first opening is configured for attachment to the second opening of the capture module body. A trap door is positioned within the identification module body that is movable by an animal and a trap door sensor generates a trap door signal when the trap door is moved by an animal. An illumination source is positioned within the identification module body to selectively generate illumination within the body and a camera positioned within the identification module body selectively captures an image from within the body.

A retention module has a body with first and second openings, the first opening being for attachment to the second opening of the capture module body and has a release hole formed therein. A shield selectively covers the release hole and an actuator attached to the retention module body and the shield selectively moves the shield to cover and uncover the release hole. A bait module has a first opening for attachment to the second opening of the retention module body.

An electronics module has a controller, interface circuitry electrically coupled to the controller and to interface with the capture sensor in the capture module, the actuator, the trap door sensor, the illumination source and the camera in the identification module, and the actuator in the retention module, and a memory. The memory having stores machine executable instructions that, when executed by the controller, cause the controller to receive the capture signal from the capture sensor and responsive thereto, monitor the trap door sensor, receive the trap door signal from the trap door sensor and responsive thereto, activate the illumination source, and activate the camera to capture an image of an animal in the identification module, and analyze the captured image to identify whether the animal in the identification module is a targeted animal. If the animal is the targeted animal, the controller processes the animal in the retention module and activates the actuator in the retention module to uncover the release hole.

According to one aspect of the present invention, an example of a method for selectively capturing a targeted animal involves capturing an animal in a capture module having a one way capture mechanism and, using instructions executing in a controller, sensing the animal in an identification module and, responsive thereto, capturing an image of the animal, analyzing the captured image to identify whether the animal is a targeted animal, if the animal is the targeted animal, processing the animal, and releasing the animal. Additional examples involve performing chromatic and/or pattern analysis on the captured image, using the chromatic and/or patent analysis results, searching a database for machine recognized animal colors and/or patterns, generating a probabilistic assessment based on color and/or pattern of whether the animal in the identification module is the targeted animal, and generating a target determination indication based on the probabilistic assessment based on color and/or pattern. In some examples, processing the animal may include injecting the animal using a syringe.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
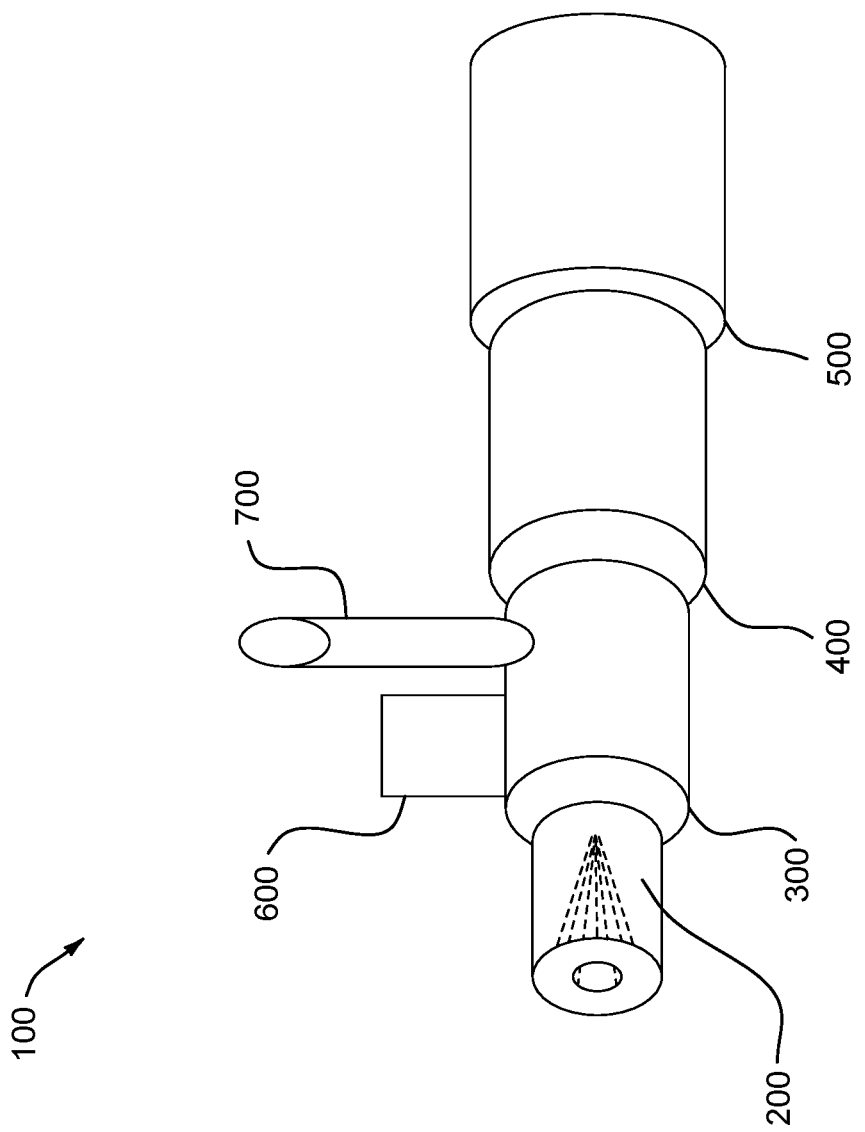
FIG. 1 is a schematic diagram that illustrates one example of an animal trap apparatus according to certain aspects of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Examples are discussed herein of an animal capture approach to exercise control over what is captured and intelligent decision-making around its disposition. Also, due to reasons of accessibility of habitat, difficulty in observation and pure cost, examples are described for an unattended apparatus for conducting population studies and other scientific investigation. Further, though one impetus for developing this apparatus is to contribute to biological research and the capture or destruction of invasive, predatory snakes in the Everglades, some examples may be useful to study and manage other types of animals. It is anticipated that some examples of an apparatus may be adapted to be deployed to study and manage fish, mammals, or other wildlife.

One aspect of certain examples of the present invention includes a user-specifiable entry hole. With appropriate sizing, animals larger than the targeted species or lifecycle stage can be excluded. Another aspect of some examples includes a user-specifiable throttle point that excludes animals physically unable to overcome the pressure applied. Still another aspect of some examples includes the ability to use an artificially intelligent system to identify exactly what type, and sometimes what lifecycle stage, of animal has been captured. Another aspect of some examples includes a controller programmed to apply preprogrammed parameters, near real-time expert evaluation, and environmental parameters to make a non-attended retain/release decision.

Another aspect of some examples includes an option to apply a hypodermic injection or other treatment to targeted animals. This may be useful, for example, to implant a chip in, sterilize, vaccinate, inoculate, or even kill, the captured animal.

The foregoing and other features and advantages of a preferred embodiment of the present invention will be more readily apparent from the following detailed description, which proceeds with references to the accompanying drawings.

Certain examples of the present invention relate to a method and apparatus for the intelligent, selective capture of targeted animal species in a controlled fashion. In some examples, animals visiting the apparatus are physically screened for physical characteristics at a coarse (i.e. pre-capture) level, then further scrutinized using computer-assisted technology to make a probabilistic determination of their species. The scrutiny is possible because during initial capture the animal is confined to an area where lighting and proximity to cameras are controlled, producing images with environmental variability largely removed.

Some examples of the present invention are modular and may be assembled and deployed in a variety of configurations that would result in the ability to: capture only, observe and release only, deliver an injection or not, etc. The description below describes the modules and several embodiments of their combination into an integral unit.

FIG. 1 is a schematic diagram that illustrates one example of an animal trap apparatus 100 according to certain aspects of the present invention. The trap 100 includes a physical capture module 200, an identification module 300, a retention module 400, a bait module 500, electronics module 600, and an injection module 700.

In some examples, the modules may be transported separately and assembled on-site in the manner shown. Alternatively, to ease storage and transportation, one or more of the modules of apparatus 100 may be dimensioned so that one module fits inside another when the apparatus is disassembled, as illustrated in the relative size of the modules in FIG. 1.

Figure 2:
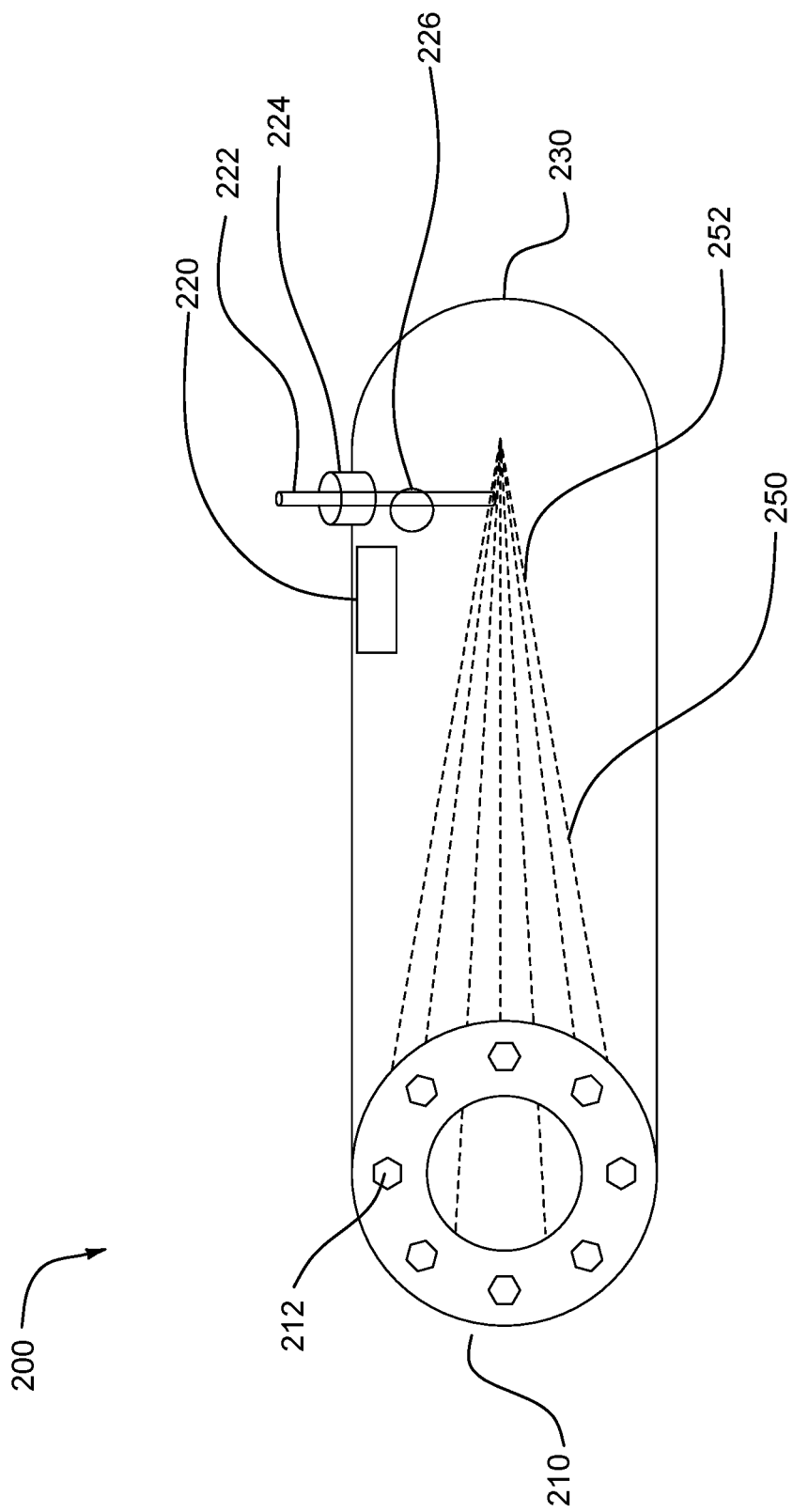
FIG. 2 is a schematic diagram that illustrates one example of the physical capture module of FIG. 1.

FIG. 2 is a schematic diagram that illustrates one example of the physical capture module 200 of FIG. 1. The capture module includes an entryway 210, the diameter of which may be selected to selectively trap only animal small enough to fit within. The entryway 210 serves as an attachment point for components of the capture mechanism 250 disposed within capture module 200. Elements that form a framework of the capture mechanism 250 are bolted or otherwise rigidly affixed around the perimeter of the entrance way 210. This design allows animals unable to penetrate the downstream end of the capture mechanism 252 to escape easily. When the capture mechanism's downstream end 252 is spread by an incoming animal, an indicator rod 222 is lifted, providing a signal that an animal has attempted entry. In this example, the rod 222, once lifted, remains in its most-lifted position. In order for the position to be maintained, one example relies on friction between the rod 222 and a housing 230 for capture module 200. In the example shown in FIG. 2, rod 222 is composed, at least in part, of ferrous material and a cylinder 224 affixed to the housing 230 includes a magnet 226. A sensor module 220 is electrically coupled to the magnet 226 and the electronics, wiring, and logic for the electrical module 220 are described in detail below. The module housing 230, is a cylindrical tube that is composed of a material, such as aluminum or polyvinyl chloride (PVC), that is rigid, resilient and waterproof.

Figure 3A:
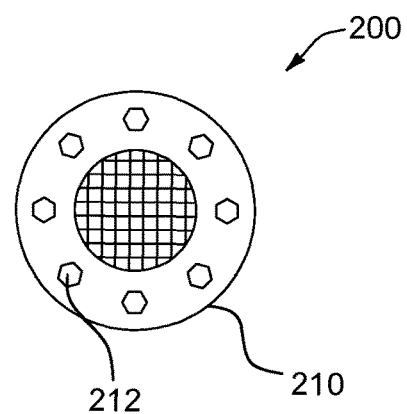
FIGS. 3A and 3B are schematic diagrams illustrating examples of the capture mechanism of FIG. 2 without the external housing of the capture module.
Figure 3B:
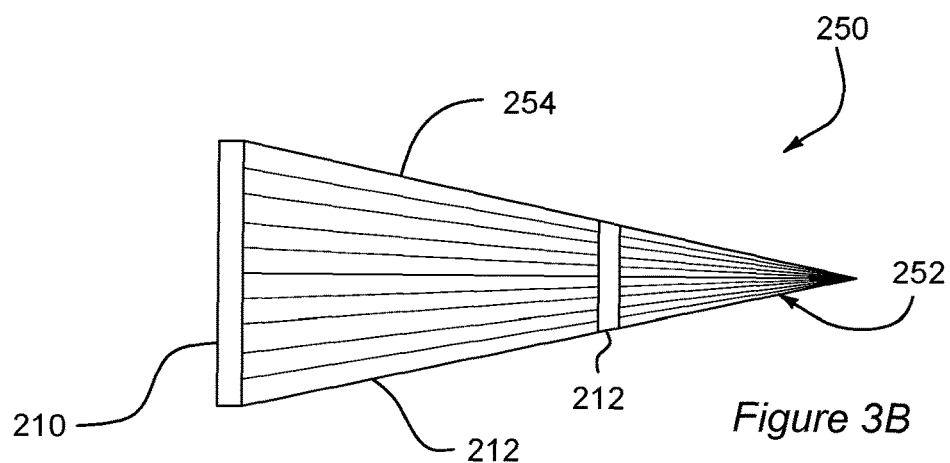

FIGS. 3A and 3B are schematic diagrams illustrating examples of the capture mechanism 250 of FIG. 2 without the external housing of the capture module. The capture mechanism 250 is designed to be a one-way passage from the environment external to the trap 100 into the interior of the trap. FIG. 3A is a view looking into an opening in the entryway device 210. FIG. 3B is a side view of capture device 250. In this example, entryway device 210 is a rigid, circular structure with an opening formed in the center of the structure that serves to control the entryway spacing and otherwise secure spokes 260 at fasteners 212 disposed around the perimeter of entryway device 210.

Spokes 260 form a substantially conical structure that serves as a perimeter of the capture mechanism 200. The spokes 260 are made from a material, such as steel or aluminum, that is flexible enough to be bound together at the downstream end 252 of the capture mechanism 250 and rigid enough to resist spreading from a captured animal. In one example designed for smaller or less powerful animals, bicycle spokes are used as spokes 260. In another example designed for large animals, the spokes 260 are reinforcement bars typically used in cement construction.

Figure 3C:
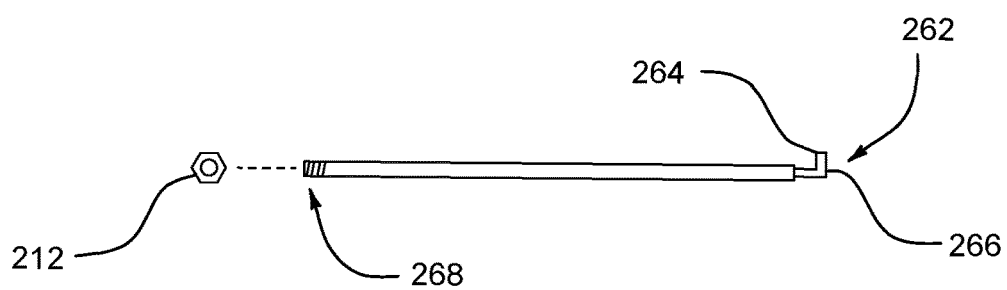
FIG. 3C is a schematic diagram illustrating one example of a spoke shown in FIGS. 3A and 3B.

FIG. 3C is a schematic diagram illustrating one example of a spoke 260 shown in FIGS. 3A and 3B. A downstream end 262 of the spoke 260 has a bent portion 264 and a sharpened portion 266 in order to deter escape from the downstream end 262 once the animal has been captured. In the example shown, a threaded nut 212 is used to secure a threaded end 268 of spoke 260 to the entryway device 210. The threaded nut 212 may be treated with a thread locking compound to prevent the spoke from coming loose from entryway device 210.

Returning to FIG. 3B, at the downstream end 252 of capture mechanism 250, a compression band 256 is deployed in order to bring together the ends of the elements that form the perimeter of the capture mechanism in order to prevent a captured animal from escaping by this route. The compressive force may be varied depending on the materials employed, such that only animals with sufficient strength to overcome the compressive force can pass through capture module 200 in order to enter the trap while other animals can escape through the opening in entryway device 210. In one example, compression band 256 is composed of latex bands. In another example, compression band 256 is composed of annular springs.

A flexible, resilient material 254 is disposed about the interior or exterior of spokes or elements 260 to create a barrier that prevents animals from penetrating the capture mechanism 250. The resilient material prevents an already-captured animal from spreading the spokes or elements of the capture mechanism and effecting escape. The resilient material 254 is generally elastic to permit the spokes 260 to spread and permeable to air so that animals may sense bait placed in bait module 500. One example of resilient material 254 is the high-performance fabric used in football uniforms. Another example utilizes athletic wrap to create a cone-shaped covering for spokes or elements 260.

Figure 4A:
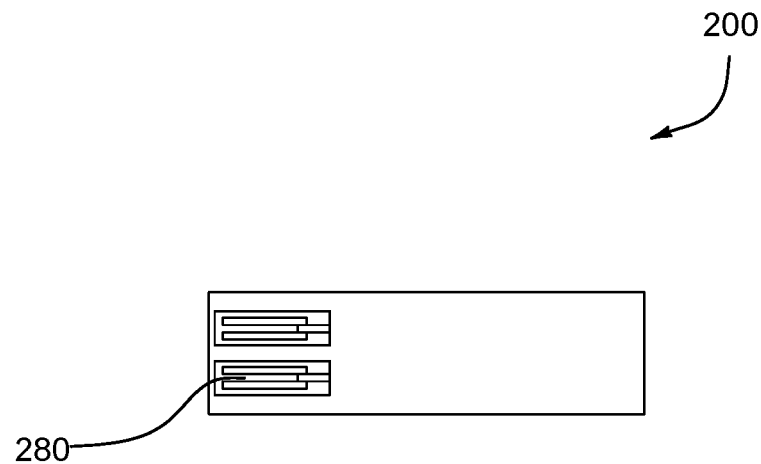
FIGS. 4A and 4B illustrate another example of an implementation of the capture module of FIG. 1.
Figure 4B:
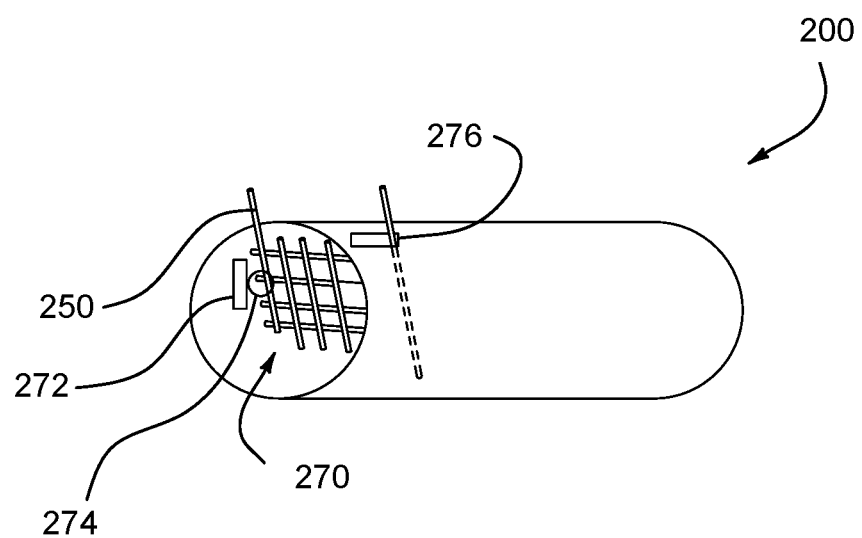

FIGS. 4A and 4B illustrate another example of an implementation of a capture module 200, where FIG. 4A is a top view and FIG. 4B is a perspective side view. In this example, a trap door 270 is provided that is constructed to swing only inward into the body of the capture module 200. When door 270 is forced open, sensors 272 and 276 may be activated by a magnet 274 attached to the trap door 270. Sensor 272 indicates when the door 270 is shut and sensor 276 indicates when door 270 is open. At least one of the sensors 272 or 276 sends a signal to a processing unit indicating that the door has been opened and activating the processing unit to process a potential animal capture. Compression springs 280 may be optionally provided to require more resistance to the opening of the door to exclude individual animals that are not strong enough to force the door open with the compression springs in place.

Figure 5:
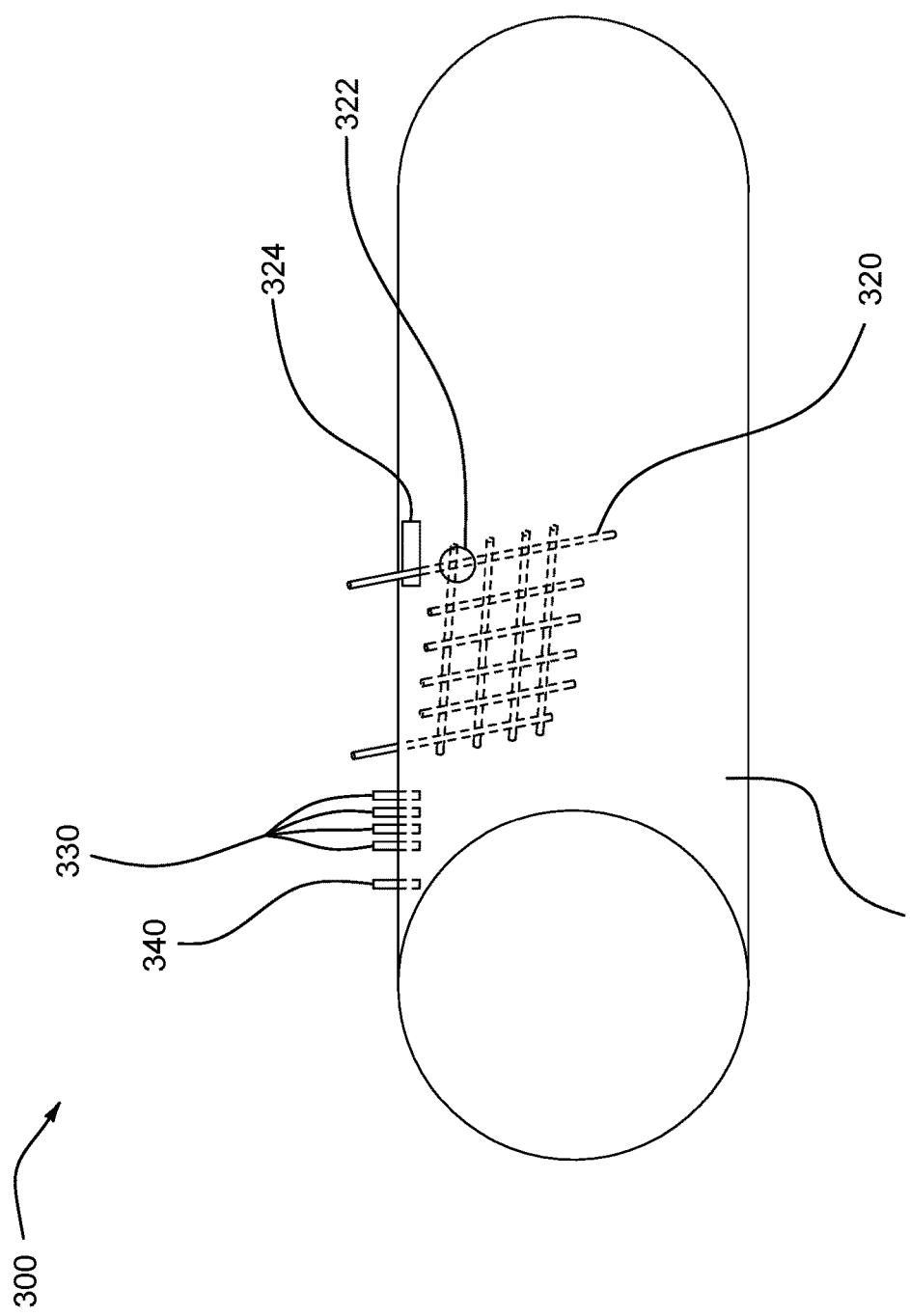
FIG. 5 is a schematic diagram illustrating one example of the identification module 300 of FIG. 1.

FIG. 5 is a schematic diagram illustrating one example of the identification module 300 of FIG. 1. The identification module is positioned between the capture module 200 and the retention module 400 and provides a passageway for the captured animal as it is attracted to bait in bait module 500. Identification module is substantially a tube with one opening in communication with the capture module 200 and another opening in communication with the retention module 400.

The identification module 300 example of FIG. 5 includes an outer housing 310 constructed to be physically connected to the capture module 200 and retention module 400 and electronically coupled to electronics module 600. The example illustrated utilizes rigid, tubular plastic that is configurable to fit with the other components to which it is connected. Within the housing 310, there is a trap door 320 with an attached magnet 324 that, when door 320 is moved by a captured animal within, causes magnet 324 to activate a sensor 324 to signal a main computer in electronics module 600. The main computer responds by activating an illumination source 330 and a camera 340 obtain a photograph of the captive animal. Illumination may include visible lighting devices, such as lamps or light emitting diodes, non-visible lighting devices, such as infrared light sources, or other devices, such as lasers. Similarly, camera 340 may be a visible light photographic device, an infrared imaging device, or a laser or photodiode receiver.

It may improve imaging for identification to standardize or limit variation in aspects of the expected image. In some examples, the interior surface of the identification module 300 is treated to provide a uniform color that may be electronically screened out when the photograph is analyzed by the electronics module 600. Also, the orientation of the camera 340 with regard to an animal confined within the interior space of the identification module at a given point in time may be helpful. The trap door 320, when moved, signals to a process running in a computer in electronics module 600 that: the captive is in a known location, against a known background, and in a known orientation. When specifically-controlled lighting is applied, predictable, high-quality images may be acquired and passed on to analytical components in the electronics module 600 of the system.

Figure 6A:
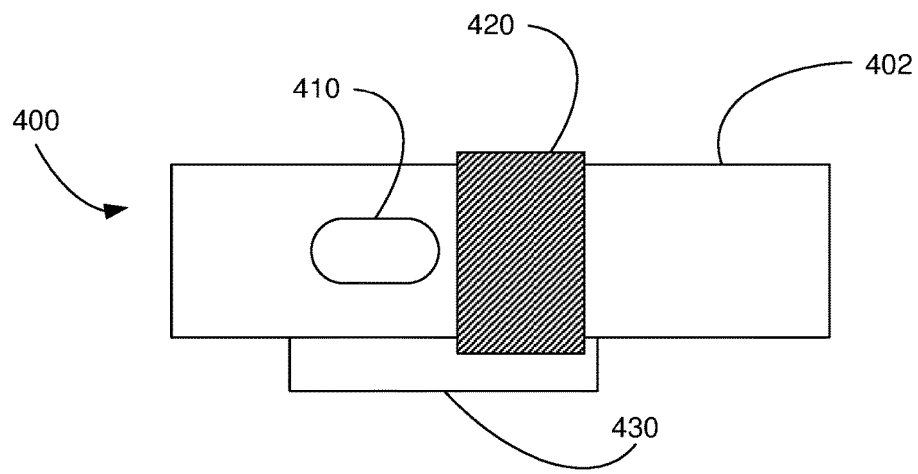
FIGS. 6A, 6B, and 6C are schematic diagrams illustrating an example of the retention module 400 of FIG. 1.
Figure 6B:
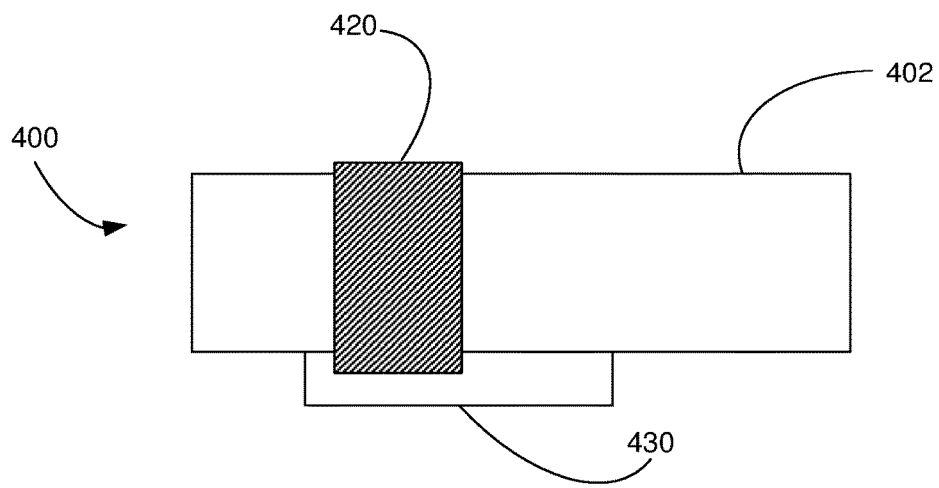
Figure 6C:
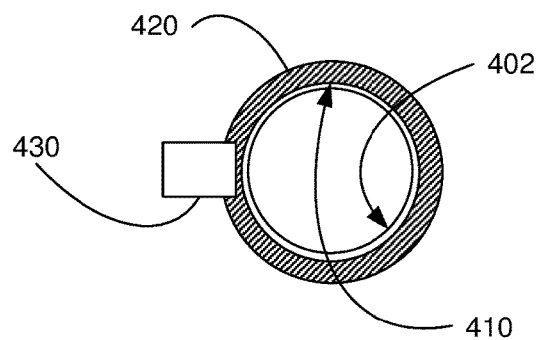

FIGS. 6A, 6B, and 6C are schematic diagrams illustrating an example of the retention module 400 of FIG. 1. FIG. 6A is a top view of retention module 400 illustrating a release opening 410. FIG. 6B is a top view illustrating retention module 400 with the release opening 410 covered by cover 420. FIG. 6C is an end view of retention module 400 illustrating cover 420 and a mechanism 430 for actuating the cover 420 with respect to the release opening 410. In this example, retention module 400 is composed of a rigid, tubular body 402, such as aluminum or PVC, with an aperture for a release opening 410 formed in the wall of the body.

A shield 420 fits over the body 402 and is mechanically coupled to an actuator 430 for moving shield 420 longitudinally parallel to a central axis of the tubular body 402 to controllably cover or open the release opening 410. FIG. 6A illustrates shield 420 in a position along body 402 that uncovers release opening 410. FIG. 6B illustrates shield 42 in another position along body 402 that covers release opening 410. FIG. 6C is an end view of this example of retention module 400 and that shows shield 420 as a co-axial sleeve around the body 402 that is connected to actuator 430. The actuator 430 is in electrical communication with electronics module 600 so that the actuator 430 may be controlled by a controller in the electronics module.

In the example of FIGS. 6A, 6B and 6C, the actuator 430 is operable to move the sleeve of shield 420 longitudinally along the central axis of tubular body 402. In this example, actuator 430 may be implemented using a threaded rod connected to an electric motor attached at one end and supported by a bushing at another end. A threaded nut is threaded onto the threaded rod and attached to the shield 420. When the motor causes the threaded rod to rotate, the shield 420 moves longitudinally to selectively cover or uncover the release opening 420.

Figure 7A:
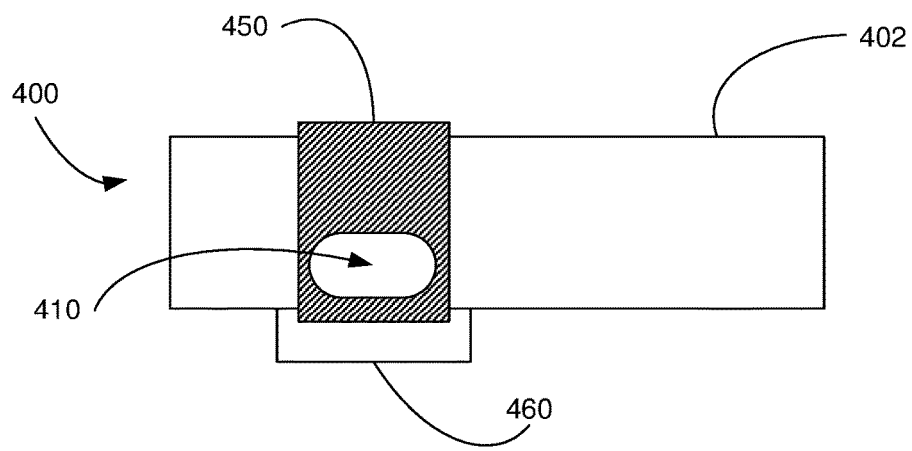
FIGS. 7A and 7B are schematic diagrams illustrating another example of the retention module 400 of FIG. 1.
Figure 7B:
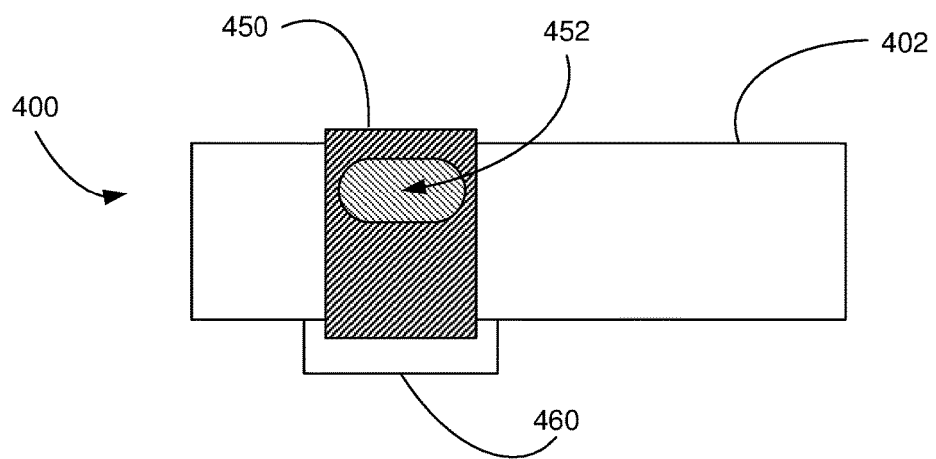

FIGS. 7A and 7B are schematic diagrams illustrating another example of a retention module 400. In this example, shield 450 is a sleeve that fits over the body 402 and has an aperture 452 formed in it that substantially matches the release opening 410. Shield 450 is attached to actuator 460, which is operable to rotate shield sleeve 450 around the central axis of the tubular body 402 so as to selectively align the aperture 452 in shield sleeve 450 with release opening 410. For example, actuator 460 may be a motor that drives a drive wheel or gear that engages shield sleeve 450 so that the controller in electronic module 600 may activate the motor to rotate the aperture 452 into alignment with the release opening 410, as is shown in FIG. 7A, to open the retention module or rotate the aperture 452 out of alignment with release opening 410 in order to close the retention module.

One of ordinary skill in the art will appreciate that a variety of approaches may be utilized to implement retention module 400 without departing from the scope of the present invention. For example, the shield may be implemented as a trap door that is swiveled inward into the body 402 to open or shut by an actuator or the shield may be a flap that is moved longitudinally or rotated to open or close the release opening 410. Still other examples may use a solenoid for actuation to open and close the release opening 410 as well as more sophisticated linear actuators and servos that are available commercially. Yet another example may utilize an outwardly swinging door to cover release opening 410 when retention of the captive is of less concern or not the goal of the trapping activity.

Figure 8A:
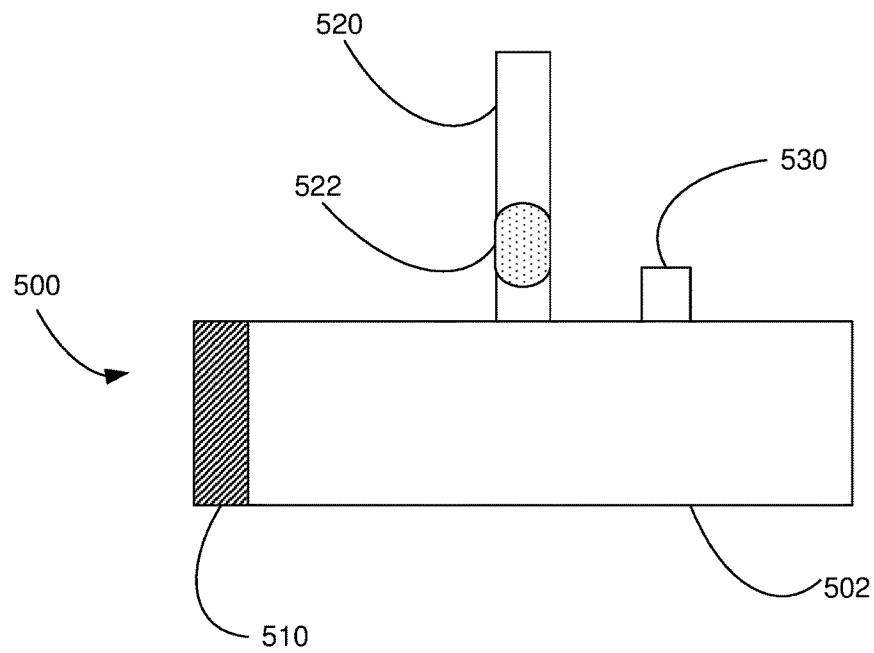
FIGS. 8A and 8B are schematic diagrams illustrating an example of bait module 500 of FIG. 1.
Figure 8B:
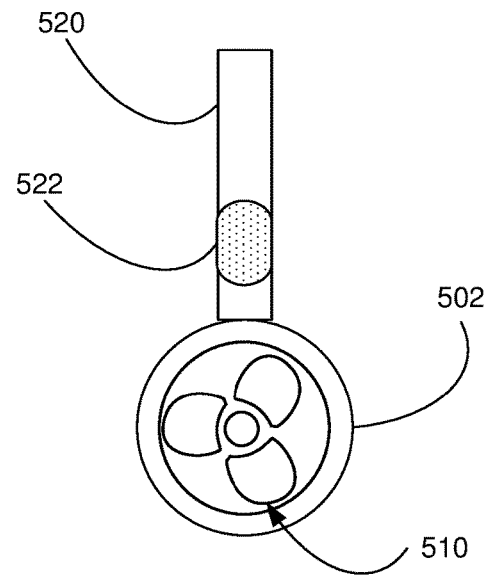

FIGS. 8A and 8B are schematic diagrams illustrating an example of bait module 500 of FIG. 1. In this example, bait module 500 is constructed with a rigid, tubular body 502 similar to the other modules. A ventilation fan 510, which may be under the control of electronics module 600, is positioned at an open end of tubular body 502 that is connected or in communication with retention module 400 while the other end of the tubular body is enclosed. A bait container 520 is provided to introduce bait or bait odor to the interior of bail module 500 and may contain an auger or similar controllable device for introducing bait into the bail module 500 under control of the controller in electronics module 600. A temperature sensor 530 may be included to provide a temperature signal to the controller that may be utilized to control the operation of ventilation fan 510.

The bait module 500 typically contains the attractant to motivate an animal to enter the trap. In its simplest form, it is a detachable, easily maintained enclosure. If the mechanism is deployed in an attended or semi attended mode, it may contain live bait, such as a rodent or insect, or other types of bait, such as fruit or vegetables, to attract a target animal. Other attractants may also be utilized, such as rabbit essence or rodent urine stored and dispensed from optional bait container 520. Appropriate bait can be actively dispensed at selected time intervals using the auger or similar device 522 controlled by electronics module 600. The controller in electronics module 600 may control the speed or operation of ventilation fan 510 to provide a flow of air from the bait module through the other modules to the entryway 210 of capture module 200 in FIG. 1 in order to draw animals into the trap.

Figure 9:
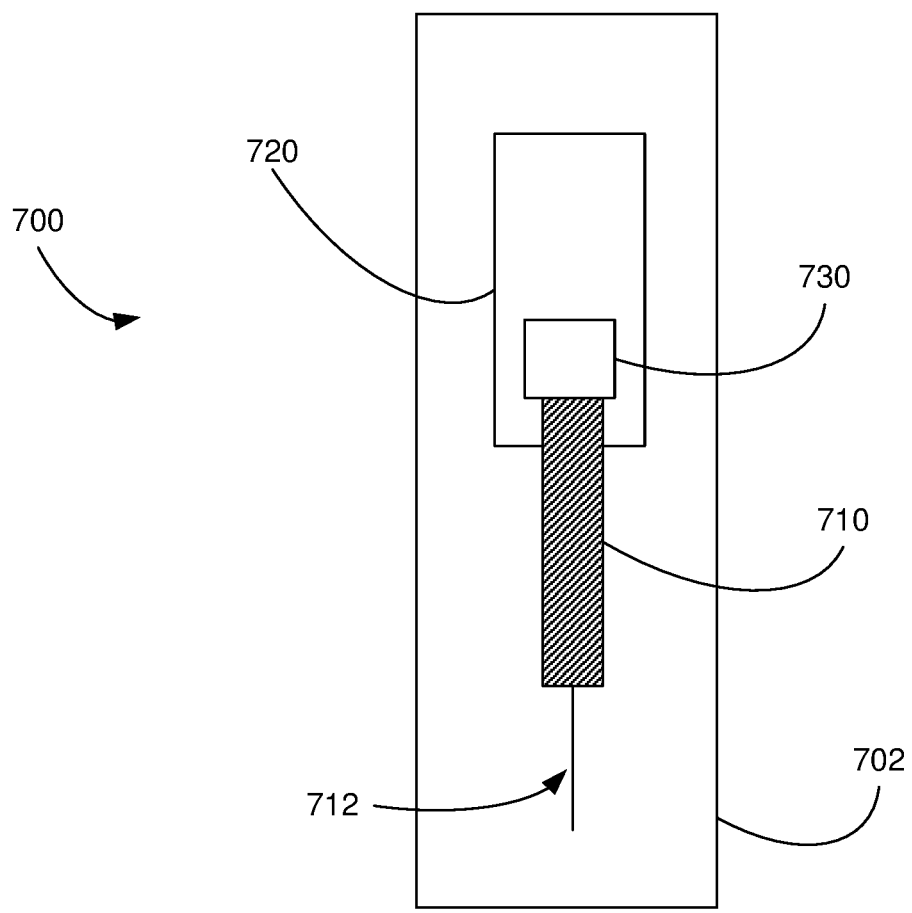
FIG. 9 is a schematic diagram illustrating an example of the injection module 700 of FIG. 1.

FIG. 9 is a schematic diagram illustrating an example of the injection module 700 of FIG. 1. Injection module 700, in this example, is constructed from a rigid tube body 702, which houses syringe 710 with hypodermic needle 712, that has one opening configured to engage with the identification module 300. Syringe 720 is mechanically coupled to actuator 720, which may be a solenoid or similar device, that is under the control of the controller in electronics module 600. When activated by the controller, actuator 720 drives syringe 710 downward into the interior of identification module 300 such that hypodermic needle 712 enters an animal held in the identification module 300. The controller then activates motor 730, which pressurizes syringe 710 to deliver a dose of an injectable substance into the animal.

Different injectable substances may be employed for different goals. If the goal of the trap 100 is animal control, such as reducing feral python populations, then the injectable substance may be lethal. For example, second generation anticoagulants, such as brodifacoum, bromadiolone, difenacoum, or difethialone may be utilized because they kill after a single administration, but act slowly enough that the injected, but still ambulatory, animal may be released from the retention module 400 so that the trap may be utilized for another animal. Other injectable substances that may be utilized may include pathogens or anti-reproduction drugs. If the goal is to examine and tag an animal, then the syringe or another device may be utilized to insert a tracking chip into the animal. Still another goal may be disease control and the injectable substance may be, for example, a drug, a vaccine or an inoculation.

Figure 10:
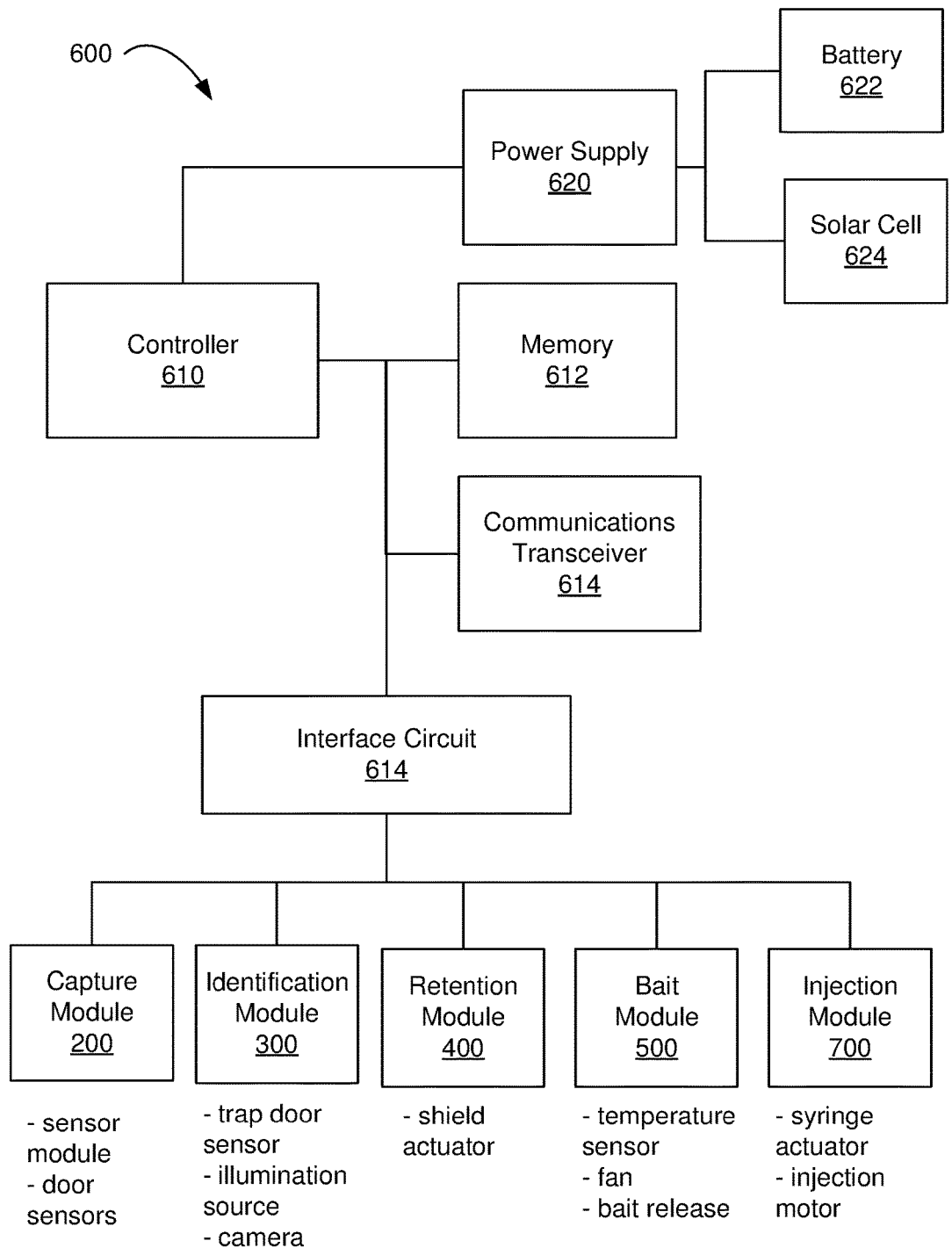
FIG. 10 is an architecture diagram illustrating one example of electronics module 600 of FIG. 1.

FIG. 10 is an architecture diagram illustrating one example of electronics module 600. The module includes a controller 610 with a processor to execute instructions stored in memory 612, a communications transceiver 614, and a power supply 620 that provides power to controller 610 from battery 622. A solar cell 624 or other power source may also be provided to charge battery 622.

Communications transceiver 614 may be included to provide, for example, alerts or telemetry via a communications link or to communicate with a connected device, such as a personal computer or phone. For example, transceiver 614 may include WiFi or other wireless communication that enables joining a network. In one example, software, such as BATMAN, is provided that permits creation of an ad hoc mesh grid network. Any device on the network can communicate with any other device on the network, either directly or via a series of "hops" from one device on the network to another. The ad hoc network can be extended by any one of its nodes if that node can communicate with the outside world. If any device has access to a cellular, WiFi, satellite, or even ham radio connection information can be relayed to and from the outside world. Thus, a device or network of devices may operate autonomously in remote locations, yet still be guided by human intervention when that becomes desirable.

The controller 610 interfaces with the electrical devices in the different modules of the trap 100 through interface circuit 614. The interface circuit 614 receives signals from some electrical devices, such as sensors or cameras, and drives other electrical devices, such as actuators, illumination sources and motors. For example, interface circuit 614 receives electrical signals from the sensor modules in capture module 200. Interface circuit 614 receives trap door sensor signals and camera images from identification module 300 and drives one or more illumination sources. One of ordinary skill in the art will understand that a variety of interface techniques and implementations are possible, such as wired or wireless connections, without departing from the scope of the invention.

Figure 11:
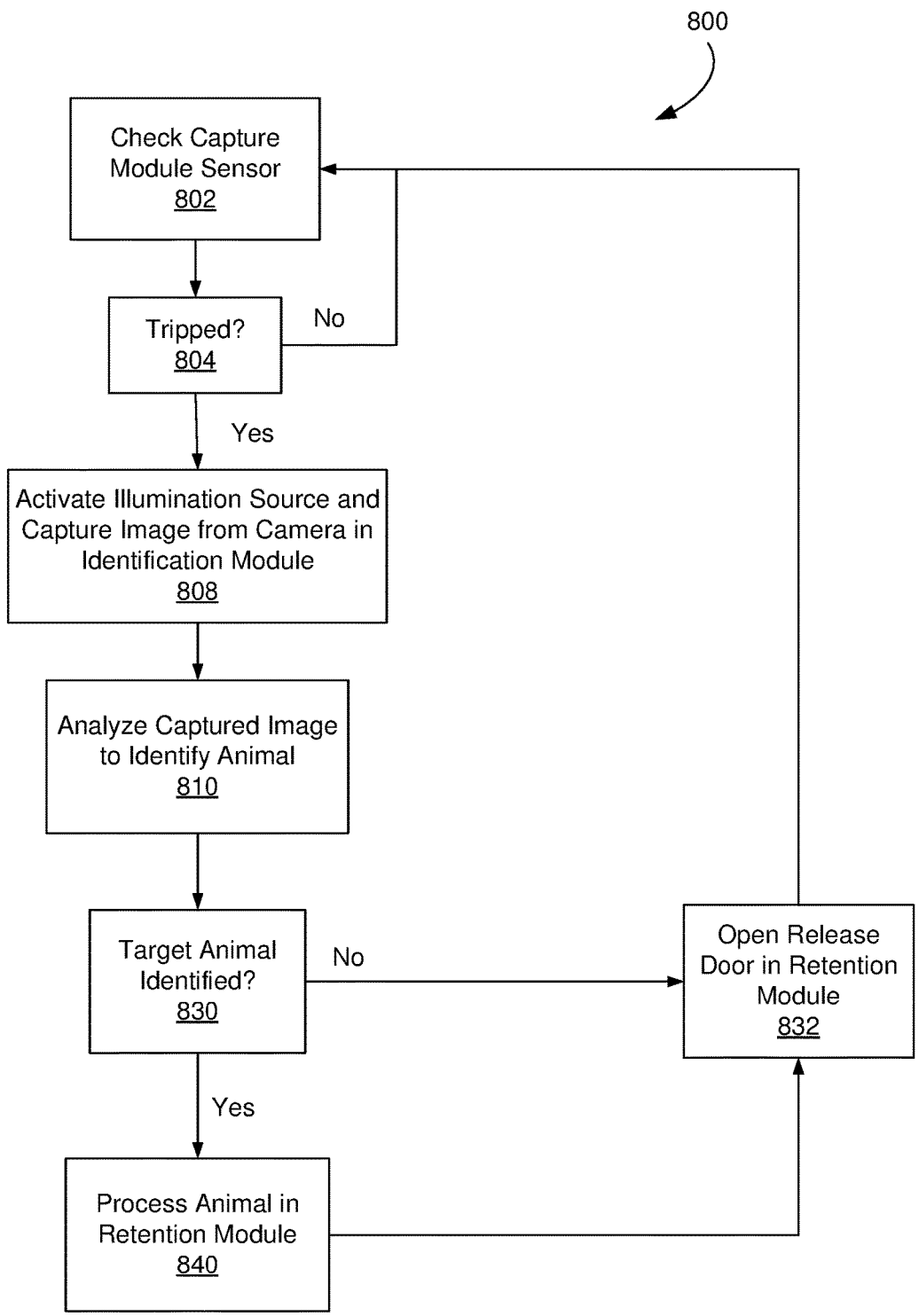
FIG. 11 is a control flow diagram illustrating an example of a capture process executing within the controller of FIG. 10.

FIG. 11 is a control flow diagram illustrating an example of a process 800 executing within the controller 610 in electronics module 600. At step 802, controller 610 periodically checks sensor module 220 in capture module 200 to determine if the sensor indicates that something has entered the capture module. Alternatively, a signal from sensor module 220 may generate an interrupt in controller 610 that wakes the controller and starts the check.

If sensor 220 has been tripped, then, at step 804, control branches to step 808 where controller 610 activates illumination source 330 and camera 340 in identification module 300 to capture an image of the animal. The captured image is analyzed at step 810 to identify the animal in the image. At 830, if the animal is identified as a target animal, e.g. a python, control branches to 840 to process the animal in the retention module 400. If the animal is not a targeted animal at 830 or processing at step 840 is completed, then control branches to 832 where controller 610 activates actuator 430 to move shield 420 to open release opening 410 of retention module 400. Control then returns to 802 to await the next animal to enter the capture module 200.

Figure 12:
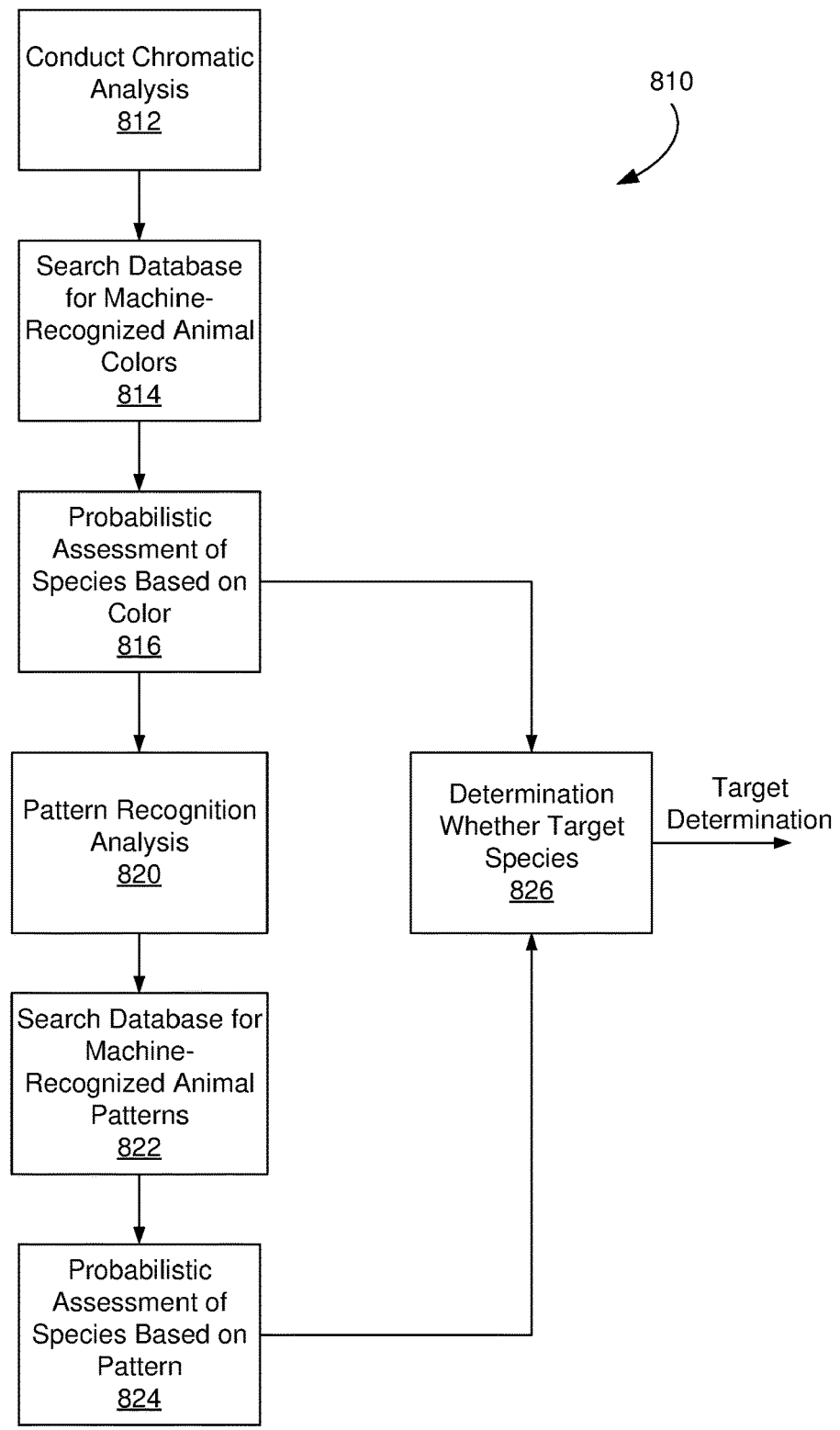
FIG. 12 is a control flow diagram illustrating one example of a process step of FIG. 11 where a captured image is analyzed to identify an animal.

FIG. 12 is a control flow diagram illustrating one example of step 810 of FIG. 11 where the captured image is analyzed to identify an animal. In this example, at 812, chromatic analysis is performed on the captured image and, at 814, a database is searched for machine-recognized animal colors, e.g. the yellow of yellow pythons, which may be useful in identifying the animal that matches the color recognized in the image. At 816, a probabilistic assessment is made as to whether the animal is likely a match for a target species based on color in the image. At 820, pattern recognition analysis is performed on the image and, at 822, the database is searched for machine-recognized animal patterns, e.g. the pattern of markings typical to pythons, which may be useful in identifying the animal that matches the pattern in the image. At 824, a probabilistic assessment is made as to whether the animal is likely a match for a target species based on a pattern recognized in the image. At 826, based on the probabilistic assessment from step 816 and/or step 824, a determination is made as to whether the animal in the image matches a target species. Note that the criteria shown are examples and more or fewer criteria than those shown may be utilized to recognize a target species.

In one example of chromatic analysis, the chromatic analysis is conducted by analyzing the captured photograph on a pixel-by-pixel basis, binning the colors, and creating a reduced-color palette representation of the image. This analysis may include opening the image file, replacing the background color of the image with alpha, e.g. no color, counting the number of pixels of each unique color, aggregating similar colors and count the number of pixels in each color bin, and creating summary statistics, e.g. fraction of pixels with a hue value between 80-100 HSV (hue, saturation and value).

The analysis may then involve querying a database of known animals, separated by species, based on the data and statistics developed above. A statistical analysis may then be made to determine the probability of the individual animal belonging to any species known to the database. The identification may then be recorded and reported. The result is a "digital fingerprint" of each image captured. Each may be characterized in one or more of the color models, e.g. RGB, HSV, CYMK, and the fraction of the entire image made of each specific color. These may be dynamically added to the database along with a copy of the captured image. A human may later verify the color-based prediction. As the database grows larger, the statistical probability of an accurate prediction grows for mathematical reasons. One of skill in the art will recognize that other approaches to chromatic analysis are possible without departing from the scope of the invention.

Chromatic analysis alone may be sufficient for some purposes, e.g. differentiating between an endangered indigo snake and an invasive Python. However, chromatic analysis may not be sufficiently discriminating when two or more species both have similar coloration and widely ranging phenotypes. For instance, the same chromatic analysis on a brown water snake and an Eastern diamondback snake yield coloration patterns that are quite similar to each other. A combination of the pattern-based and chromatic analysis can provide more definitive recognition. For some species, it may be possible to identify individuals based on the unique topography of their coloration. In some examples, therefore, pattern recognition for machine-recognizable topologies of species is utilized with pattern data obtained from the database.

In one example of pattern based analysis, the image file is modified to replace background "green screen" color with alpha (no color), reduce the image to gray-scale, reduce the gray-scale image to a binary (two-color) image, and invert the pixel values. For each of several rotations of the image, for each of several splits (e.g. 50/50, 60/40, 70/30), and for each half of each split image, flip to a symmetrical orientation and calculate linear regression coefficients and statistics, which are saved. These results are compared to find a rotation and split combination that produces a best fit. The results may also be compared across rotations to determine if beta coefficients and fits are robust. And the beta coefficients of the halves of the best fit result added and compared against results for species defined in the database to determine the presence of identifying markings, e.g. "pythonic" markings. In this pattern analysis, comparison of the pattern data with that of other similarly-colored snakes will generally yield a poor fit that is not typically robust to rotation results. For example, a diamondback rattlesnake shows little possibility for a good linear regression fit to a python pattern even with any feasible rotation or split. One of skill in the art will recognize that other approaches to chromatic analysis are possible without departing from the scope of the invention.

Figure 13:
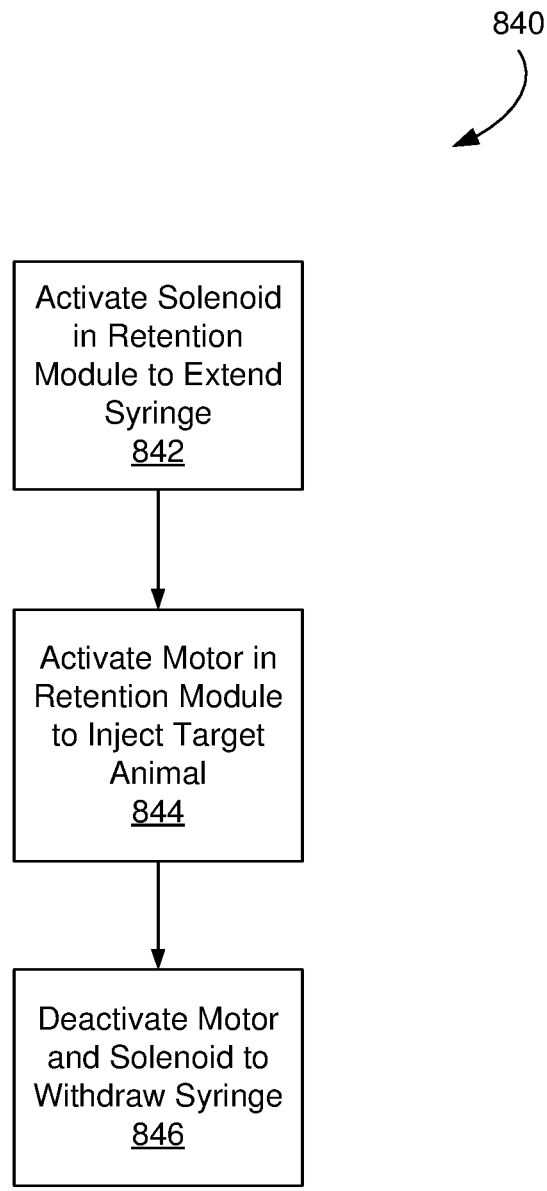
FIG. 13 is a control flow diagram illustrating one example of a process step in FIG. 11 where an animal in the retention module 400 is injected.

FIG. 13 is a control flow diagram illustrating one example of process step 840 in FIG. 11 where the animal in the retention module 400 is injected. At 842, controller 610 activates solenoid 720 to extend syringe 710 into the retention module 400 so that hypodermic needle 712 enters the body of the target animal. Once syringe 710 is extended, at 844, controller 610 activates motor 730 to inject the substance in syringe 710 into the animal. At 846, controller 610 deactivates solenoid 720 to withdraw syringe 710 from the retention module.

Note that some implementations of the processing illustrated above may execute in different devices or processors from controller 610. For example, if controller 610 has a wireless data connection to a wide area network, e.g. a cellular data connection, the captured color and pattern data may be transmitted to a server for color and pattern analysis and the result transmitted to the controller 610 for further processing and control actions based upon the result.

Figure 14:
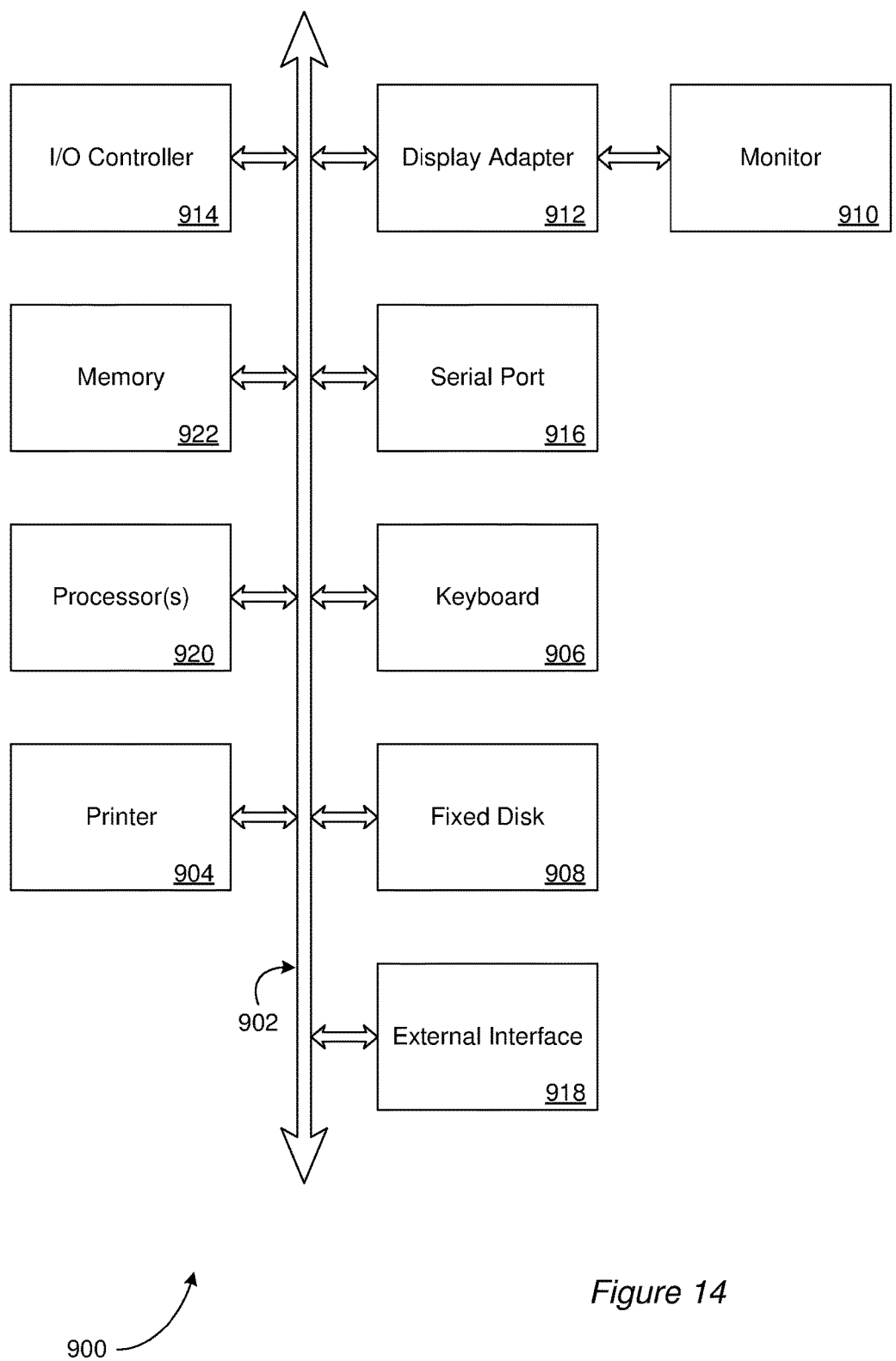
FIG. 14 depicts aspects of elements that may be present in a computer device and/or system configured to implement a method, system and/or process in accordance with some embodiments of the present invention.

FIG. 14 depicts aspects of elements that may be present in a computer device and/or system configured to implement a method, system and/or process in accordance with some embodiments of the present invention.

In accordance with at least one embodiment of the invention, the system, apparatus, methods, processes and/or operations for providing access to a proximate device from a mobile device may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system.

As an example, FIG. 14 depicts aspects of elements that may be present in a computer device and/or system 900 configured to implement a method and/or process in accordance with some embodiments of the present invention. The subsystems shown in FIG. 14 are interconnected via a system bus 902. Additional subsystems include a printer 904, a keyboard 906, a fixed disk 908, and a monitor 910, which is coupled to a display adapter 912. Peripherals and input/output (I/O) devices, which couple to an I/O controller 914, can be connected to the computer system by any number of means known in the art, such as a serial port 916. For example, the serial port 916 or an external interface 918 can be utilized to connect the computer device 900 to further devices and/or systems not shown in FIG. 14 including a wide area network such as the Internet, a mouse input device, and/or a scanner. The interconnection via the system bus 902 allows one or more processors 920 to communicate with each subsystem and to control the execution of instructions that may be stored in a system memory 922 and/or the fixed disk 908, as well as the exchange of information between subsystems. The system memory 922 and/or the fixed disk 908 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

I claim:

1. An apparatus for selectively capturing a targeted animal, the apparatus comprising:
 a capture module having:
  a capture module body, the capture module body having formed therein first and second openings,
  an entryway disposed in the first opening and having a diameter selected to limit a size of animals that may enter,
  a flexible capture mechanism attached to the entryway and having a downstream end disposed adjacent the second opening of the capture module body, the flexible capture mechanism having a perimeter that is resistant to penetration by animals, the flexibility of the capture mechanism being selected to require a minimum level of strength required to spread the capture mechanism and pass through the downstream end, and the downstream end of the capture mechanism being normally biased in a closed position, and
  a capture sensor configured to generate a capture signal responsive to the downstream end of the capture mechanism being forced open;
 an identification module having:
  an identification module body, the identification module body having formed therein first and second openings, the first opening being configured for attachment to the second opening of the capture module body,
a trap door disposed within the identification module body that is movable by an animal,
a trap door sensor configured to generate a trap door signal when the trap door is moved by an animal,
an illumination source disposed within the identification module body and configured to selectively generate illumination within the identification module body, and
a camera disposed within the identification module body and configured to selectively capture an image from within the identification module body;
a retention module having:
a retention module body, the retention module body having formed therein first and second openings, the first opening being configured for attachment to the second opening of the capture module body, and having a release hole formed therein,
a shield configured to selectively cover the release hole, and
an actuator attached to the retention module body and the shield and configured to selectively move the shield to cover and uncover the release hole;
a bait module having:
a bait module body, the bait module body having formed therein a first opening, the first opening being configured for attachment to the second opening of the retention module body;
an electronics module having:
a controller,
interface circuitry electrically coupled to the controller and to interface with the capture sensor in the capture module, the actuator, the trap door sensor, the illumination source and the camera in the identification module, and the actuator in the retention module, and
a memory, the memory having stored therein machine executable instructions that, when executed by the controller, cause the controller to:
receive the capture signal from the capture sensor and responsive thereto, monitor the trap door sensor,
receive the trap door signal from the trap door sensor and responsive thereto, activate the illumination source, and activate the camera to capture an image of an animal in the identification module,
analyze the captured image to identify whether the animal in the identification module is a targeted animal,
if the animal is identified as the targeted animal, automatically execute an injection process for the animal in the retention module, and
activate the actuator in the retention module to uncover the release hole.

2. The apparatus of claim 1, wherein one of the capture module body, the identification module body, the retention module body and the bait module body is dimensioned so as to fit within another one of the capture module body, the identification module body, the retention module body and the bait module body when disassembled.

3. The apparatus of claim 1, wherein the instructions that, when executed, cause the controller in the electronics module to analyze the captured image to identify whether the animal in the identification module is a targeted animal include instructions that cause the controller to:
conduct chromatic analysis of the captured image,
using the chromatic analysis results, search a database for machine recognized animal colors,
generate a probabilistic assessment based on color of whether the animal in the identification module is the targeted animal, and
generate a target determination indication based on the probabilistic assessment based on color.

4. The apparatus of claim 3, wherein the instructions that, when executed, cause the controller in the electronics module to analyze the captured image to identify whether the animal in the identification module is a targeted animal further include instructions that cause the controller to:
conduct pattern recognition analysis of the captured image,
using the pattern recognition analysis results, search a database for machine recognized animal patterns,
generate a probabilistic assessment based on pattern of whether the animal in the identification module is the targeted animal, and
generate the target determination indication based on the probabilistic assessment based on color and the probabilistic assessment based on pattern.

5. The apparatus of claim 1, wherein the instructions that, when executed, cause the controller in the electronics module to analyze the captured image to identify whether the animal in the identification module is a targeted animal include instructions that cause the controller to:
transmit the captured image to a server for analysis, and
receive from the server an identification result indicating whether the animal in the identification module is a targeted animal.

6. The apparatus of claim 1, the apparatus further including:
an injection module having:
a syringe with a hypodermic needle,
a first actuator in the injection module mechanically coupled to the syringe and configured to, when activated, extend the syringe into the identification module, and
a second actuator in the injection module mechanically coupled to the syringe and configured to, when activated, cause the syringe to inject a substance within the syringe;
the interface circuitry is further electrically coupled to interface with the first and second actuators in the injection module; and
wherein the instructions in the memory that, when executed, cause the controller in the electronics module to, if the animal is the targeted animal, automatically execute an injection process for the animal in the retention module include instructions that cause the controller to:
activate the first actuator in the injection module, and
activate the second actuator in the injection module.

7. The apparatus of claim 1, the apparatus further including:
a communications transceiver electrically coupled to the controller; and
wherein the instructions that, when executed, cause the controller in the electronics module to analyze the captured image to identify whether the animal in the identification module is a targeted animal include instructions that, when executed, cause the controller in the electronics module to, utilizing the communications transceiver, transmit data relating to the captured image to a server and receive from the server an indication result indicating whether the animal is the targeted animal.

8. The apparatus of claim 1, where the bait module further includes a ventilation fan disposed in the first opening of the bait module.

9. A method for selectively capturing a targeted animal, the method comprising:
capturing an animal in a capture module having a one way capture mechanism;
using instructions executing in a controller,
sensing the animal in an identification module and, responsive thereto, capturing an image of the animal;
automatically analyzing the captured image to obtain a target determination indicating whether the animal is a targeted animal;
if the target determination indicates that the animal is the targeted animal, automatically executing an injection process for processing the animal; and
releasing the animal.

10. The method of claim 9, wherein the step of automatically analyzing the captured image to obtain a target determination indicating whether the animal is a targeted animal includes:
chromatically analyzing the captured image,
using the chromatic analysis results, searching a database for machine recognized animal colors that substantially match the chromatic analysis results from the captured image,
generating a probabilistic assessment based on one or more results of the searching a database for machine recognized colors of whether the animal in the identification module is the targeted animal, and
generating a target determination indication based on the probabilistic assessment based on the one or more results of the searching a database for machine recognized colors.

11. The method of claim 10, wherein the step of automatically analyzing the captured image to obtain a target determination indicating whether the animal is a targeted animal further includes:
performing pattern recognition analysis of the captured image,
using the pattern recognition analysis results, searching a database for machine recognized animal patterns that substantially match the pattern analysis results from the captured image,
generating a probabilistic assessment based on one or more results of the searching a database for machine recognized animal patterns of whether the animal in the identification module is the targeted animal, and
generating the target determination indication based on the probabilistic assessment based on the one or more results of the searching a database for machine recognized colors and the probabilistic assessment based on the one or more results of the searching a database for machine recognized animal patterns.

12. The method of claim 11, wherein the step of, if the target determination indicates that the animal is the targeted animal, automatically executing an injection process for processing the animal includes, using instructions executing in the controller to communicate over a wireless connection to transmit the target determination to a server.

13. The method of claim 9, wherein the step of automatically analyzing the captured image to obtain a target determination indicating whether the animal is a targeted animal further includes:
transmitting the captured image to a server for analysis, and
receiving from the server the target determination indicating whether the animal in the captured image is a targeted animal.

14. The method of claim 13, wherein the step of automatically analyzing the captured image to obtain a target determination indicating whether the animal is a targeted animal further includes, using instructions executing in the server:
receiving the captured image;
chromatically analyzing the captured image,
using the chromatic analysis results, searching a database for machine recognized animal colors that substantially match the chromatic analysis results from the captured image,
generating a probabilistic assessment based on one or more results of the searching a database for machine recognized animal colors of whether the animal in the identification module is the targeted animal,
generating the target determination based on the probabilistic assessment based on the one or more results of the searching a database for machine recognized animal colors, and
transmitting the target determination to the controller.

15. The method of claim 14, wherein the step of automatically analyzing the captured image to obtain a target determination indicating whether the animal is a targeted animal further includes, using instructions executing in the server:
performing pattern recognition analysis of the captured image,
using the pattern recognition analysis results, searching a database for machine recognized animal patterns that substantially match the pattern analysis results from the captured image,
generating a probabilistic assessment based on one or more results of the searching a database for machine recognized animal patterns of whether the animal in the identification module is the targeted animal, and
the step of generating the target determination based on the probabilistic assessment based on the one or more results of the searching a database for machine recognized animal colors comprises generating the target determination based on the probabilistic assessment based on the one or more results of the searching a database for machine recognized animal colors and the probabilistic assessment based on the one or more results of the searching a database for machine recognized animal patterns.

16. The method of claim 9, wherein the step of, if the target determination indicates that the animal is the targeted animal, automatically executing an injection process for processing the animal automatically executing instructions in the controller to:
actuate a solenoid to extend a syringe into the retention module; and
actuate a motor to inject the animal with a substance within the syringe.

17. The method of claim 9, wherein:
the step of automatically analyzing the captured image to obtain a target determination indicating whether the animal is a targeted animal includes:
transmitting the captured image to a server over a wireless connection; and
the method includes:

receiving from the server the target determination indicating whether the animal is the targeted animal.

18. A method for selectively capturing a targeted animal in a computerized trap, the method comprising:
    capturing an animal in a capture module having a one way capture mechanism that permits the animal to enter a first opening of the capture module;
    detecting that the animal has entered an identification module in communication with the capture module;
    capturing image data for the animal in the identification module; and
    in a controller in the computerized trap:
        analyzing at least one of color and pattern attributes of the image data to obtain a determination whether the animal should be processed; and
        if the determination indicates that the animal should be processed, automatically executing an injection process.

19. The method of claim 18, wherein the step of analyzing at least one of color and pattern attributes of the image data to obtain a determination whether the animal should be processed comprises:
    transmitting the image data to a server for analysis; and
    receiving from the server the determination whether the animal should be processed.

* * * * *